July 10, 1928.

W. J. GEE 1,676,859

VARIABLE SPEED GEAR

Filed July 29, 1926

INVENTOR
William John Gee
BY S. Sokol.
ATTORNEY

July 10, 1928.  1,676,859
W. J. GEE
VARIABLE SPEED GEAR
Filed July 29, 1926  2 Sheets-Sheet 2

INVENTOR
William John Gee
BY S. Sokal
ATTORNEY

Patented July 10, 1928.

1,676,859

UNITED STATES PATENT OFFICE.

WILLIAM JOHN GEE, OF LONDON, ENGLAND.

VARIABLE-SPEED GEAR.

Application filed July 29, 1926, Serial No. 125,812, and in Great Britain August 11, 1925.

This invention relates to improvements in or modifications of the variable speed gears according to my co-pending U. S. patent application Serial No. 34,058, filed 1st June 1925.

One object of the present invention is to bring about the desired correction or compensation for the disconformity between the spiral form of the gears and the action of the pivoted control ring, whilst restricting the angle at which the control has to be set for any given speed ratio. For instance, in the construction shown in the said prior specification, if the angle of the spiral of the gears be about 24 degrees, the angle of the control when in the no-speed position might be about 37 degrees. By the present invention, a considerably smaller angle for the control would be required.

Another object of the present invention is to secure a simpler construction of the gear.

Another object of the invention is to facilitate a more robust design within given dimensions than would be possible with the prior construction.

According to the present invention, the boss carried by the driving shaft, with its radial and longitudinal slots is dispensed with. The ends of the toothed sections to be controlled are adapted for part of their traverse to overhang the end of the boss which carries them. Each toothed section is connected to the control by a radial link, pivoted at one point to the section and at the other end connected to the control by a ball and socket joint. This link is so mounted that no movement is allowed in relation to the section in the longitudinal direction but an oscillatory movement is possible in a plane at right angles to the axis of the gear. The control comprises a rotating ring into which the balls of the ball and socket joints above referred to are mounted equidistantly. This ring runs in a bearing or housing preferably between balls, rollers or other friction reducing arrangements, and this bearing or housing is pivoted to the framing of the gear so that its angle, and consequently the angle of the rotating ring can be varied for the purpose of varying the ratio of transmisson. This ring, with its equidistantly disposed ball joints or connections to the sections is rotated through a universal joint by the driving shaft of the gear at the same speed as the driving boss and the toothed sections mounted thereon.

The new arrangements of parts and method of obtaining the required correction or compensation effects an important simplification of construction, and it will also be apparent that on account of the greater space available, a more robust design is possible than would be the case when a number of parts have to be crowded together near the centre line of the gear.

The accompanying drawings show a construction embodying the features of the invention.

Figure 1:
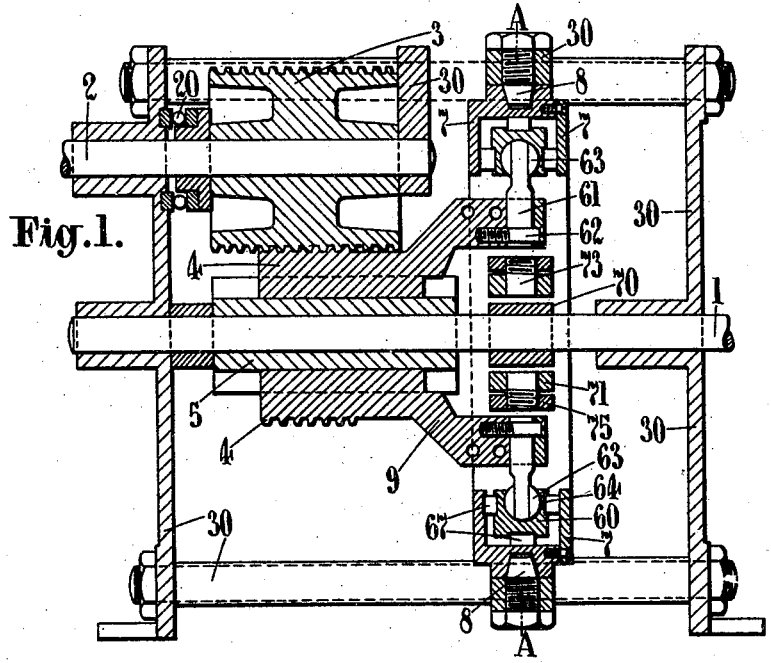
Fig. 1 is a sectional elevation, the control member being shown in the full speed position.
Figure 2:
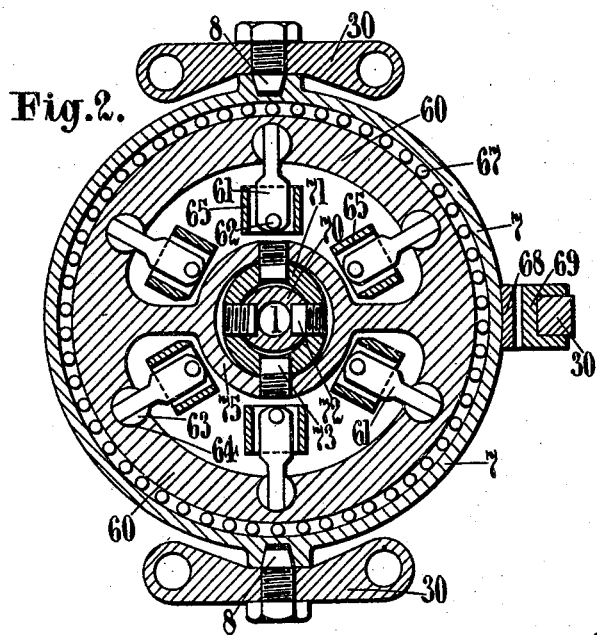
Fig. 2 is a section on line A—A of Fig. 1.

1 is the driving shaft and 2 is the driven shaft of the gear, 3 is a helical gear wheel keyed to the driven shaft 2. The driving gear 4 is divided into sections which are slidably mounted in a boss 5 which is keyed to the driving shaft 1. These sections are therefore carried round by the rotation of the boss 5 but are free to slide in the boss longitudinally to an extent limited by the control device. The ends 9 of the toothed sections 4 to be controlled overhang the end of the boss which carries them. Each toothed section 4, 9 is connected to the control 60, 7 by a radial link 61, pivoted at 62 to the overhanging part 9 of the section and at the other end connected to the control ring 60 by a universal joint constituted by the ball 63 and a corresponding recess 64 of the ring 60. The pivot 62 is constituted by a bolt passed through a strap 65 and screwed into the end face of the overhanging part 9 the strap 65 being fixed to the extension 9 by bolts passed through holes 66. The link 61 is therefore so mounted that it has no longitudinal movement in relation to the sections 4, but may oscillate relatively to the section in a plane at right angles to the axis of the gear. The control comprises a rotating ring 60 into which the balls 63 of the universal joints above referred to are mounted equidistantly. This ring 60 runs in an annular housing 7 preferably between balls, rollers or other friction reducing arrangements 67. The annular housing is pivoted at 8 to the framing 30 of the gear so that its angle and consequently the angle of the rotating ring 60 can be varied for the purpose of varying the ratio of transmission by means of toothed segment 68 and toothed rack 69. The ring 60 with its equidistantly disposed universal joints to the section 4 is rotated through a universal joint by the driving shaft 1 of the gear at the same speed as the driving boss 5 and the toothed sections 4 mounted thereon. The universal joint consists of a boss 70 keyed to the shaft 1, intermediate ring 71 pivoted to the boss 70 at 72, and ring 75 integral with or connected to the ring 60 and pivotally mounted on the intermediate ring 71 at 73.

Figure 3:
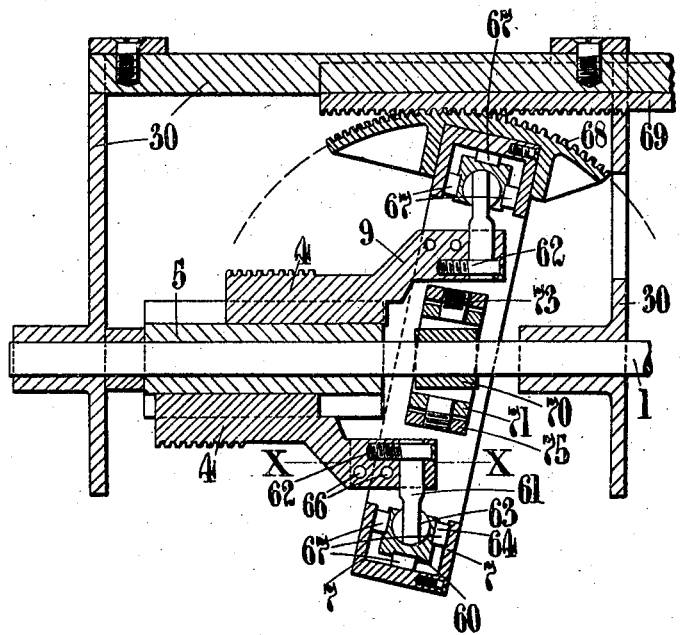
Fig. 3 is a horizontal section showing the control member in the no-speed position.
Figure 4:
Fig. 4 is a section on line X—X of Fig. 3 showing a detail of construction.

When the control is parallel with the plane of rotation of the gear as shown in Fig. 1, the sections 4 and their connections to the control ring 60 are always in line longitudinally, but when the control is inclined (Fig. 3) the points at which the links 61 are connected to the ring 60 will at the beginning of the engagement of a section 4 with the spiral of the driven wheel 3, be slightly in advance of the longitudinal line through the centre of the section, and this advance or lead will gradually diminish until when the middle of the section is engaged with the driven wheel, the section and its connection with the control will be in line longitudinally. After passing the middle point of its engagement with the driven member the point of connection of the section and control will lag behind until at the moment of disengagement of the section with the driven wheel it will be as much behind the longitudinal centre line on the section as it was in advance of it at the beginning of the engagement. The effect of this discrepancy of movement is, of course, proportionate to the obliquity or angle of the control, and will have the effect of bringing about an amount of correction or compensation which will be sufficient to cause the drive of the driven member of the gear by the driving member to be substantially smooth and continuous.

The effect of the above arrangement is that for a given angle of spiral of the gear wheels, the angle of the control at the no-speed position will be much more favorable: approximately about one-third of the angle that would be needed by the prior construction. Consequently, if required, substantially wider angles may be employed for the gear wheels with this construction of the control and compensating movements whilst keeping the required angle of the control within degrees more favorable to the mechanical efficiency of the gear. This is also an important feature of the present invention in cases where it is desired to utilize the possibility of obtaining a drive of the driven member in the reverse direction by moving the control past the no-speed position.

I claim:

A variable speed gear or disengaging coupling comprising rotatable driving and driven elements having intermeshing helical teeth, one element being formed in sections, means for sliding the sections of said one element along its axis relative to the other element, speed control means for causing a pre-determined extent of movement of the sections of one element along the axis thereof, comprising a rotating control ring adapted to be adjusted about a pivot passing diametrically through its centre, links pivotally connected to the sliding sections so as to oscillate in a plane at right angles to the axis of the gear and universal joints connecting the outer ends of the links to the rotating control ring, substantially as described.

In testimony whereof I have hereunto set my hand.

WILLIAM JOHN GEE.